(12) United States Patent
Shuy et al.

(10) Patent No.: US 8,525,441 B2
(45) Date of Patent: Sep. 3, 2013

(54) LAMP POWERING TECHNOLOGY

(75) Inventors: Geoffrey Wen-Tai Shuy, Taipei (TW);
Chang-Horang Li, Hsinchu (TW);
Hsin-Chen Lai, Taichung (TW)

(73) Assignee: LT Lighting (Taiwan) Corp., Hsinchu (TW)

( * ) Notice: Subject to any disclaimer, the term of this patent is extended or adjusted under 35 U.S.C. 154(b) by 115 days.

(21) Appl. No.: 13/312,902

(22) Filed: Dec. 6, 2011

(65) Prior Publication Data

US 2012/0200235 A1 Aug. 9, 2012

(51) Int. Cl.
*H05B 37/02* (2006.01)

(52) U.S. Cl.
USPC .......................................... 315/297; 315/307

(58) Field of Classification Search
None
See application file for complete search history.

(56) References Cited

U.S. PATENT DOCUMENTS

| | | | |
|---|---|---|---|
| 2003/0146715 A1* | 8/2003 | Suomi | 315/291 |
| 2008/0025013 A1 | 1/2008 | Lockamy et al. | |
| 2008/0246416 A1 | 10/2008 | Jones et al. | |
| 2009/0039797 A1 | 2/2009 | Wang et al. | |
| 2010/0097001 A1 | 4/2010 | Kuo | |
| 2010/0225239 A1 | 9/2010 | King | |
| 2011/0193515 A1 | 8/2011 | Wu et al. | |

OTHER PUBLICATIONS

PCT/US2012/054280, Notification of Transmittal of the International Search Report and the Written Opinion of the International Searching Authority, or Declaration dated Nov. 26, 2012. (10 pages).

* cited by examiner

*Primary Examiner* — Crystal L Hammond
(74) *Attorney, Agent, or Firm* — Workman Nydegger (57) ABSTRACT

A device is designed for channeling electricity to a lamp, and adjusts downwards the amount of power channeled to the lamp as a function of available electrical energy in the source. In so doing, a reduction in the available energy in the source causes a less proportionate reduction in luminosity of the lamp. This might be accomplished by passing the electricity through a passive network of resistors and diodes on its way down to the lamp. In one example, the electrical energy source may be a battery that is powered by one or more solar panels. In that case, the device may also perform the function of protecting the battery from being overly charged. It channels downwards a greater daily lamp's energy consumption than that of daily electrical charging from the solar panels, when the available battery energy is near its full capacity.

20 Claims, 4 Drawing Sheets

LAMP POWERING TECHNOLOGY

BACKGROUND

Solar powered street lamps are in commercial use. Solar powered street lamps receive solar energy from the sun in the form of light. The light photons are converted into electricity by a solar panel. A battery system stores electrical energy, where it can be used during dark conditions (e.g., nighttime, or cloudy times) to power the street lamp.

Conventional commercial solar powered street lamps aim to be able to provide lighting over three continuous rainy. However, existing commercial solar powered street lamps are not able to sustain lighting for three continuous rainy days under certain very normal and common situations. Accordingly, streets that are arrayed with such solar powered street lamps are often left dark.

The inventors performed a study to reveal the root cause key issues for this problem; and then invent the system designs to overcome this issue; as disclosed in this patent disclosure.

BRIEF SUMMARY

At least one embodiment described herein relates to a devise for channeling electricity from an electrical energy source to a lamp when the lamp is consuming electricity, and when doing so adjusts downwards the amount of power channeled to the lamp as a function of available energy in the electrical energy source. In so doing, a reduction in the available energy in the electrical energy source causes a less proportionate reduction in luminosity of the lamp. This might be accomplished by passing the electricity through a passive network of resistors and diodes on its way from the electrical energy source to the lamp, which reduces the power consumption by the device. In one example, the electrical energy source may be a battery that is powered by one or more solar panels. In that case, the device may also channel electricity from the solar panel(s) to the battery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

The principles described herein related to a technology for powering a lamp that potentially includes a passive network of diodes and resistors. The lamp design further includes a system control unit (such as a control box) that allows for increased lighting stamina in a longer series of continuous rain days as compared to commercial lamps even for the same given solar panel and battery.

The lamp can be operated across the full range of the available stored energy in the battery. As the battery's stored energy decrease, the systems' power consumption is reduced and the system efficacy is increased, while still maintaining the lighting above the required brightness. In other words, the novel system can continuously (or step by step) improve efficacy as battery stored energy drains down.

Solar powered lamps use solar panels to charge batteries during sunny conditions (hereinafter referred to as "sunny days") when significant numbers of sun-originated photons are incident on the solar panel. However, dark conditions also exist in which lesser or no sun-originated photons are incident on the solar panel. For instance, dark conditions certainly exist during the nighttime, but may also exist at dawn, dusk, or during overcast days (hereinafter referred to as "dark nights or days", or "rainy days") when cloud cover, mist, smog, rain, fog, or any other impediment keeps much of the sun energy from reaching the solar panel.

Dark days do happen with some amount of frequency depending on the weather patterns, the time of year, and the region of the Earth. In order to account for this, solar powered lamps are thus supposed to sustain several nights of lighting for a certain promised period in the absence of sunshine (e.g., during consecutive dark days). Currently, the promised period for many commercial solar lamp providers is three continuous dark days. However, according to a study performed by the inventors (described in further detail below), existing commercial solar street lamps cannot sustain their lighting for three consecutive dark days under very normal and commonly encountered scenarios.

Solar lamp systems include four subsystems including 1) the solar panel that receives sun-originated photons, and converts a portion of the corresponding photo energy to electricity, 2) a battery that receives and stores the electricity generated by the solar panel, 3) a lamp that consumes the electricity from the battery when the lamp is to emit light, and 4) a controller that controls when the lamp is on and off; and protects the battery from over-charged or over-drained conditions. In accordance with the principles described herein, when combining the lamp built with the invented passive network, the controller performs more than just the functions stated above, but also controls how much electrical power is supplied to the lamp when the lamp is on.

When replacing the lamp and the associated controller with embodiments in accordance with the inventive principles described herein, the solar powered lamp system can provide an improved (better than the commercial specified) lighting brightness in the first three nights in the presence of three consecutive dark days, starting with full battery storage capacity. After that, the lamp system can still keep lighting above the (commercial specified) required brightness for three additional nights without any solar energy input for these six consecutive days (i.e., in the presence of six consecutive dark days). Furthermore, this can be done with reduced cost as compared to the commercial system in some embodiments.

When optimized, with the system cost restricted to be below that of commercial solar powered street lamps, certain embodiments of a solar powered lamp system described herein can sustain light during dark conditions in the presence of more than nine consecutive dark days while continuing to provide light above the required levels. Such embodiments may provide better brightness than commercial systems for the first three days. The system then continues to provide at greater than 90 percent brightness (as compared to the prior day) for extra six consecutive dark days without light-out during dark conditions. Furthermore, this system leaps back to provide lighting for more than three additional nights in the presence of three further consecutive dark days, with only 4 hours effective sun shine on the tenth day.

The resulted solar powered street lamps in accordance with at least some embodiments described herein are very affordable; and also provide excellent performance. Thus, embodiments describe herein can provide a cost effective solar powered street lamps with excellent performance; among many other applications.

The Study

The inventors conducted a study that shows that existing commercial solar powered street lamps cannot sustain lighting in any three consecutive dark days under some very real, ordinary, and easily encountered scenarios. This study took into account nature, and the design parameters of commercial solar lamps; and then examined these solar lamps in some ordinary easily-encountered scenarios of normal solar powered street lamps operations. The study reveals the key reasons underlying why current commercial solar powered lamps cannot sustain three consecutive dark days under real scenarios.

Solar powered lamps use solar panels to charge batteries during the sunny daytime. Then, discharge the batteries driving lamps to light the dark nights. Therefore, the following nature data relating to sunshine, dark-hours requiring lighting, and such, was evaluated along with the characteristics of solar panels, batteries, and control boxes commonly used.

Depending on seasons, the average daily effective sunshine ranges from 3 to 4.5 hours at most of the locations suitable for installing the solar powered lamps. The required lighting time (due to darkness) ranged from 8 to 14 hours per day at these locations. Also, the season with the longer required lighting was often associated with shorter effective sunlight hours. Therefore, the design of the stand along system would typically require approximately 4 hours of solar panel exposure to sunshine to charge the battery with energy suitable for lamp consumption of approximately 12 hours lighting (and 24 hours control box operation since the control box continuously operates).

The electric energy converted from solar panel is usually stored in "12 volts" batteries in the commercial system. The so-called "12 volts" battery shall be operated in a normal range within its maximum terminal voltage (Vx), which can be in the neighborhood of 13.6 volts, and its minimum voltage (Vn), which can be in the neighborhood of 10.5 volts. Abnormal operations (either overly charging a battery to higher than Vx or draining a battery to lower than Vn) can damage the battery to shorten its life, which involves unnecessary expense. Thus, the abnormal operations of overly charging or overly draining the battery are not desirable, nor are they recommended. Thus, commercial system designs a control unit to constantly surveying the battery terminal voltage to switch-off the solar-charging when it reaches Vx, and turn-off the lamp when it reaches Vn.

The energy storage capacity, Bx, of the battery is measured in ampere-hours (say Bx=150 ampere-hours). The energy storage capacity Bx is defined as the time integral (in hours) of the output current through the battery (in amperes) while the terminal voltage of the battery is drained from maximum terminal voltage Vx down to the minimum terminal voltage Vn. Note that every ampere-hour represents a different amount of energy in the battery; because the energy depends on what the terminal voltage was as the ampere-hour was drawn. Furthermore, a different battery could store slightly different amounts of energy at the same terminal voltage for every ampere-hour; because the internal resistances of chemical-electrical energy conversion in each and every battery can be different. Therefore, the same (watt-hours) energy consumption would have a little different value of ampere-hours at different terminal voltage of the same battery. Stated differently, energy consumption would not be exact the same value of ampere-hours at the same terminal voltage of different batteries.

Several design parameters will now be defined. The system daily energy consumption (including lighting, operations control, and inefficiency) is "D". The minimum system daily energy consumption is "Dn". The maximum daily energy consumption is "Dx". The daily converted electric energy from the solar panel output and stored into the battery is "S". Its average value in 4 hours effective daily sun-shine is "Sa" while its maximum value is "Sx"; its minimum is 0. The electric energy stored in the battery is "B". The minimum battery energy "Bn" is the minimum energy stored in the battery (i.e., Bn=0) which occurs when the battery terminal voltage V is at its minimum value Vn. The maximum battery energy "Bx" is the energy stored in the battery when the battery terminal voltage V is at its maximum value Vx. The Bx is also called the capacity of the battery. Commercially, Bx is represented in ampere-hours. Therefore, all energy units (B, S or D) presented herein are converted into ampere-hours of the battery used, unless specified otherwise.

Today, the solar panel is a primary cost driver and most expensive of the four solar panel subsystems (which include the solar panel, the battery, the lamp, and the controller). Commercial solar lamp systems are thus designed at minimized solar panel usage to maximize the system affordability. The existing commercial solar powered lamp systems all use 1.15Dx>Sa>1.1Dx. In other words, the panel size is big enough that one day of effective sunshine is sufficient to charge the batteries sufficient to provide the electric energy ("Sa") for greater than 110 percent of one day's maximum energy consumption ("Dx"); but definitely less than 115 percent of one day's maximum energy consumption ("Dx").

Today, the battery is the second cost driver of the four solar lamp subsystems. Most of commercial solar lamp providers design their full battery storage capacity Bx to be 4Dx>Bx>3.3Dx. In other words, a fully charged battery will be sufficient to provide light over of from 3.3 to 4 days of maximum energy consumption. Some commercial solar powered lamp designers increased the full battery storage capacity Bx up to 7Dx.

They also design their control and lighting subsystem (e.g., the lamp) to keep lighting power consumption "P" (i.e., the amount of power drawn from the battery to operate the lamp) constant, or at least independent of the terminal voltage. Recall that the terminal voltage V is a function of the energy B stored in the battery. Thus the daily system energy consumption (in watt-hours) D is expressed as D=(P×T)+O, where T is lighting hours of the day (average ~12 hours), and O is the 24 hours operating energy consumption other than lighting (used by the control box).

The following is a summary of the key characteristics of the existing commercial solar panel designs:

(I) The energy consumption for daily system operation (including full night lighting and 24 hrs control box operation) is designed to be: $Dx>D=(P\times T)+O$ watt-hours, where P, T, and O are defined above; while P is designed to be almost a constant wattage.

(II) The solar panel size (to provide "S" electric energy in watt-hours for battery charging in one effective sunny day) is designed to be: $1.15Dx>Sa>1.1Dx$ in watt-hrs, with Sa defined above.

(III) The battery (used to store the electric energy from solar panel and to provide electric energy for the system operation) is designed to be: $7Dx>Bx>3.3Dx$, while Bx is in its full capacity.

Since the daily energy consumption D is less than the maximum daily energy consumption Dx, and given that the battery was designed such that: $7Dx>Bx>3.3Dx$, it was conventionally considered that the conventional design can adequately guarantee operation over three consecutive rainy days. However, this is not the case as will now be explained.

The fact is that with the daily solar energy input subtracted out the required daily energy consumption, there is only a very small amount of the energy that can be gained by the battery to increase the stored energy in any given day. Under normal operation, the minimum consecutive sunny days required to charge up the battery from B=0, to B=Bx using this residue energy would be: (minimum (Bx))/(maximum residue of (S−D)). Given that the minimum Bx is equal to 3.3Dx, and given that the maximum residue of (S−D) would be equal to the 1.15Dx−Dn, the expression for the minimum sunny days may be expressed as 3.3Dx/(1.15Dx−Dn). However, this value is approximately equal to 3.3Dx/(1.15Dx−Dx), which would be 22 days. Normally, it would take 22 to 50 consecutive normal sunny days to charge-up the battery capacity to recover the full energy storage after the battery was drained for the existing commercial products. Any one additional dark day during these charge-up days would add at least six more days to its required recovery time to reach its full energy storage state. When applied a statistic code (using the Russian-roulette method) to simulate the remaining battery storage energy at any operating dawn, under the most optimistic design conditions allowed, the simulation results showed that it would be a rare situation for B>(3D−Sx). Therefore, it would be very safe to assume that B<(3D−Sx) at the dawn of most of the operating day. In other words, the following scenario analysis is suited for most of the system operation time (very ordinary and frequently encountered situations).

Even when the commercial maximum designed battery full capacity (Bx=7Dx) is assumed, there always exist many real operational situations that can collectively cause the system to reach a state in which the remaining battery stored energy, B, is less than that of (3D−M*Sx) at dawn of any given day; with M=1, or M=2. The system can encounter a scenario that the next day-time is a good average sunny day followed by 3 or more continuous dark days. Such a system cannot provide additional three nights lighting.

For M=1, this gives B=(3D−Sx)<(3D−1.15Dx)<(3−1.15)*D. In other words, the remaining battery energy at dawn is less than 1.85 days of operational energy. Then, the solar panel can only charge the battery to B=(3D−Sx+Sa) (at the followed sunny day). Since Sx>Sa, the value of B is definitely less than 3D right before encountering the three consecutive rainy days. The system definitely cannot provide full-night lighting at the 3rd night.

For M=2, the remaining battery energy can be less than 0.7 day operation at dawn. In this case, there would be no lighting at all at the third night during the three consecutive rainy days.

When the battery is drained at or before the dawn of a given day, then the lamp may provide light during the first night and part of the second night, but there would be no lighting at all during the 3rd night.

The worst scenario would be that the battery is drained at or before dawn of the given day and followed by greater than three consecutive rainy days without sunshine at all after the dawn of the given day. In that case, there will be no lighting at all during the evenings.

The above scenarios are very ordinary, normal, and commonly encountered operating situations. Therefore, the above scenario analysis clearly shows that, under the constant lighting power consumption designs, even uses the maximum commercial designed battery capacities, the commercial solar powered lamps with the currently designed solar panel recharging capacity will fail their promise of "sustaining lighting in any 3 continuous dark days". This is because at and after the battery drained, these systems can leap back to provide only about 1 more day (not three more days) lighting with averaged daily sunshine.

To further illustrate the above study and to reveal the root cause of this issue, let's take a commercial product as a worst example: We purchased a commercial street lamp (with a 130 W solar panel, two 110 Ahrs batteries). This lamp provides about 1600 lumens light-output with approximately 28 W constant lighting power and a control box consuming approximately 6 W of averaged power. The averaged energy charged into battery (Sa) through 130 W solar panel converting 4 hours effective daily sun-shine is approximately 43.3 Ahr. The daily energy consumption of this street lamp (with 12 hrs lighting and 24 hrs control box operation) is approximately 40 Ahr. The net energy gain from solar (subtract out daily consumption) is only about 3.3 Ahr. This means that it would take more than 12 consecutive sunny days (12×3.3 Ahr=39.6 Ahr) to offset 1 dark day energy deficit (approximately 40 Ahr) for this street lamp. The recovering period from its drained state to full storage would take: 220/3.3=66.7 consecutive sunny days. This street lamp was installed at a location near the center of China with greater than 4 hours annual averaged effective sunlight, and a clear space to properly receive normal sun light. It was started with a full battery capacity and only operated for less than 20 days (more than two years ago) to encounter its first "drained battery" condition. After that, this street lamp started to provide about 1 night light followed by every sunny day; and never delivered its promise of "sustain lighting in 3 consecutive dark days" since then. Of course, this lamp also encountered many additional "drained battery" conditions since its installation more than 2 years ago.

One way to deliver on the promise of continuous lighting over three consecutive dark days is to increase the solar panel size to provide a factor of three in recharging power. In that case, every daily solar power input can definitely sustain the system's energy consumption for 3 days; even the battery was drained out at the dawn of a sunny day. However, this can also lead to a prohibitive cost; and affordability suffers.

The Conclusion of the Study:

From the above study, the inventors discovered that there are three key ingredients for solar powered lamps to keep its promise to sustain lighting for greater than three consecutive dark days: (1) that the system has a large enough battery capacity (Bx>3Dx), (2) that the system has a large enough solar panel such that Sa>3Dx, and (3) that the control box reduces its daily energy consumption to insignificant level such that the Dx can be substantially reduced. However, with the cost of the subsystems (especially, the solar panel and battery), when imposing the two ingredients on the "constant lighting power" designs as in the commercial products, even with the free help from the third ingredient, the resulting systems can end up meeting the required brightness—but with prohibitive cost, or meeting the affordability—but without providing enough brightness.

The Inventions:

The inventors further invented novel LED lamp designs with passive networking LED (chips) and resistors as well as the associated control box to (overcome this issue) provide extra lighting stamina in long continuous dark days; even when uses the same solar panel and battery of the commercial system. The invention steps are described as follows:

I. Passive Networking to Shape the I-V Characteristic of LED Lamp:

Though trial and error, the inventors discovered that they can shape the I-V characteristic of LED lamps using a passive networking of LED and resistors. They also found that they can match the networking with some of theoretically selected ("desirable") I-V characteristics. In other words, their first step is to invent shaping the I-V characteristic of LED lamp through LED and resistor networking.

II. Identify the Desired I-V Characteristics Via Theoretical Analysis:

II.A Identify the I-V to Operate in the Full Battery Storage Range:

Through theoretical analysis, the inventors identified the suitable I-V characteristics for LED lamp that allowed the lamp to operate in the full battery energy storage range; which characterized by its range of terminal voltage (say, 10.5 to 13.5 volts for a "12 volts battery"). This means that these LED lamps would vary its power consumption as a function of the battery terminal voltage; P(v).

II.B Identify the I-V to Improve Efficacy in Battery Draining Down:

They further analyzed and selected from the above identified, to obtain a group of I-V characteristics that can monotonically improve their efficacy when their terminal voltage decreases across the battery voltage range.

II.C Identify the I-V to Prevent Battery Over-Charge or Over-Drain:

Since these LED lamps would vary its power consumption, P(v) as a function of the battery terminal voltage; the inventors further identified the I-V of these lamps to consume all the daily energy charged (D(Vx)>Sx) when battery is in full energy storage state (B=Bx). Thus, it prevents the battery from an over-charging.

The inventors further identified the I-V of these lamps to consume less than ⅕ of the daily energy charged by the solar panel when battery energy storage is closed to drained condition; the closer to drain condition, the less it consumes. The value of D (v) is very low when v approaching v=Vn; such that the D (v~Vn)<0.1 Sa. And approach zero energy consumption at battery drain state (P(Vn)<1 watts); preventing the battery from over-draining.

III. Integrate all the Above Inventions into LED Lamp Designs:

The inventors then shaped the I-V characteristic of a lamp using passive networking of LED and resistors to match the selected "suitable" I-V curve. Furthermore, prototypes were built to verify that this lamp can really be operated in the full battery energy storage range. The systems can also improve their efficacy when battery energy storage is draining down to provide above required brightness. In other words, the novel system can continuously (or step by step) improve efficacy when battery energy storage is draining down; and also utilize its full energy storage capacity. Furthermore, these prototypes also verified to be capable of preventing battery from being over-charging or over-draining.

IV. Design of a Control Box to Consume Insignificant Amount Energy:

Since the above designed LED lamps can also provide the functions of preventing the battery to be over-charge or over-drain, the control box can be relief from its conventional "battery protection" duty (which consumes significant amount of energy). Thus, it would allow us to design a control box to only perform switching functions of charging the battery from solar panel (or not), discharging the battery electricity to LED lamps for lighting (or not). We, therefore, designed such control box using two latch-relays to perform these two functions. The designed control box then consumes insignificant amount of energy (<0.001 ampere-hours daily) that can strengthen the lighting stamina even further.

V. Optimize the System Design:

The resistors in the network are not light emitting elements; they consumes energy without provide contribution to lighting. The inventors, therefore, scrutinized the network to get reed of all unnecessary resistances. Thus, it further strengthened the lighting stamina of the designed system. Furthermore, the inventors performed the statistic code simulations to map out the allowed design parameters' space. The results effectively guide us to optimize the matching of subsystems; and provide the path to minimize the system's cost and to maximize the system's performances.

The Results of Implementing the Inventions

The principles describe herein, on the other hand, redesign the controller and lamps. As a result, the systems can improve their efficacy during the draining down of its energy storage. The lamps can also be operated in the full range of the battery energy storage to provide above required brightness. Thus, this system can provide extra lighting stamina in long continuous dark days; even when uses the same solar panel and battery. In other words, the embodiments describe herein can make the reduction in power consumption much faster than their brightness reduction due to the improved efficacy experienced when reducing power consumption. Thus, one day's recharged energy of the existing solar panel can provide for more than three days' reduced power operation, even with the same solar panel and battery.

Therefore, the lighting subsystem in accordance with embodiments described herein vary its power consumption in accordant with the amount of electric energy stored in the batteries supporting the lamps. Since the remaining energy stored in a battery can be characterized by its terminal voltage value V, this invention designs the lighting power to be P=P (V), as function of V (the terminal voltage of the battery). Thus, the lamps are designed to consume less power when the terminal voltage of the batteries is lower. The required Dx is low enough when battery energy is at its low storage stage, such that the current solar panel size used in the commercial system can provide enough Sa to meet the Sa>3Dx for this reduced Dx.

In order to preserve the ability in providing the required brightness, the lighting subsystem is designed such that it can improve its efficacy when the battery storage energy is draining down. In other words, the less the remaining energy stored in the battery, the less it is consumed by the lamps; and yet the lamp still provide the required lighting brightness by improving system efficacy during battery energy draining This is because the reduction in the lighting energy consumption is proportionately much faster than the resultant reduction in the brightness.

Furthermore, since the designed lighting subsystem can vary its power consumption, this design further designed into its lamps to consume all the daily energy charged (D(Vx)>Sx) when battery is in full energy storage state (B=Bx); thus, preventing the battery over-charging situation (shown as embodiments). This invention further designed into its lamps to consume less than one quarter of the daily energy charged by the solar panel when battery energy storage is closed to drain condition. The closer to the fully drained condition, the less the lamp consumes, with approaching zero energy consumption at the battery drain state (D(Vn)<1 watts); preventing the over-draining situation.

Thus, the lighting subsystem embodiments, described above, can obtain two benefits: (1) one sunny day solar charge can store enough energy in the battery for more than three days of night-lighting without other energy input; as shown in the embodiments; and (2) over-charge or over-drain of the battery are prevented without the active control box intervention. The embodiments allow for a controller then just to perform the on/off switching functions for the charging and discharging of the battery. This switching function consumes an insignificant amount of daily energy.

As shown in the embodiments; when replacing the LED lighting units and the associated control unit by incorporating this invention, the commercial system can then provide a better lighting brightness in the first three nights; starting with full battery storage capacity. After that, it can still keep lighting above the required brightness for three additional nights without any energy input for these 6 consecutive days. Furthermore, this system is cost less than the original system.

When optimized in system performance, also with the system cost restricted to be below that of commercial solar powered street lamps, the novel designed systems can sustain more than nine consecutive rainy days. Furthermore, it provides better brightness than commercial solar panels for the first three nights. The system then continues to provide at >0.9 in brightness of the previous day for an extra six consecutive dark days without light-off. Furthermore, this system leaps back to provide lighting for more than three additional nights, with only 4 hours effective sun shine at the 10th day.

Having described the general principles of the embodiments described herein, embodiments themselves will now be described with respect to FIGS. 1 through 5.

Figure 1:
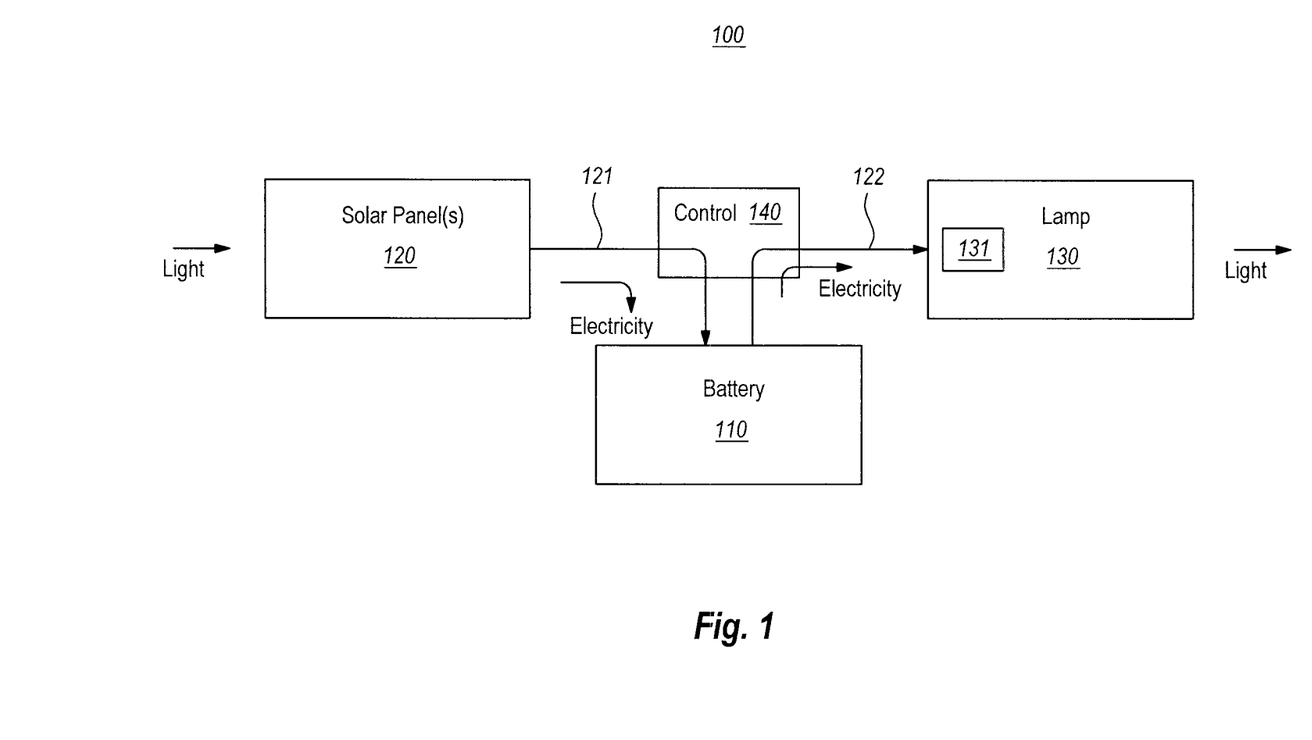
FIG. 1 abstractly illustrates a solar panel lamp system in accordance with principles described herein.

FIG. 1 illustrates a solar powered lamp system 100 that includes four subsystems such as a battery 110, a solar panel 120, a lamp 130, and a controller 140. Sun-originated light is incident on the solar panel 120. The solar panel 120 may be a single solar panel or a network of solar panels. Furthermore, the solar panel may be a currently existing solar panel, or may be a solar panel that is developed in the future. Nevertheless, as mentioned above, improved performance may be obtained even using existing solar panels. The solar panel 120 converts at least a portion of the incident light into electricity with a particular efficiency that may vary depending on the type of solar panel.

An energy collection routing circuit 121 is configured to route electrical power from the solar panel 120 to a battery 110 when the solar panel 120 and the battery 110 are coupled as illustrated. In this way, the energy collection routing circuit 121 channels electricity from the solar panel 120 to the battery 110 to charge the battery and thereby increase its energy storage during sunny conditions. While the battery 110 may be any type of battery, the principles described herein allow for improved performance even using the same battery as conventional solar lamp systems. In fact, the principles described herein may be broadened to a case in which element 110 is any electrical energy source such as, for example, a power supply device supporting by an electrical power grid. In that case, there would be no need for the lamp system 100 to include solar panel 120 or energy collection routing circuit 121. Thus, the lamp system may not have any physical "battery". In fact, the battery 110 can be replaced by "an electrical energy source". The battery 110 will be described hereinafter and is only an example of such an electrical energy source.

An energy consumption routing circuit 122 is configured to selectively route electrical power from the battery 110 (or more broadly, the "electrical energy source") to a lamp 130 when the battery 110 and lamp 130 are coupled as illustrated. In this way, the energy consumption routing circuit 122 channels electricity from the battery 110 (or more broadly, the "electrical energy source") to the lamp 130 when the lamp is consuming electricity during dark conditions. In some embodiments, the lamp 130 may emit light from one or more light emitting diodes (LED) and/or may be a street lamp that is elevated above a street, road, walkway, or area.

A controller 140 is configured to selectively channel electricity from the solar panel 120 to the battery 110 via the energy collection routing circuit 121 during light conditions, and selectively configured to channel electricity from the battery 110 to the lamp 130 during dark conditions. The controller 140 may be quite simple as it performs a simple on-off switching function. Accordingly, the daily energy consumed by the controller may be quite low as mentioned above. Depending on the electrical energy source, in some cases (such as the case of an electrical power grid) such selective channeling will not be necessary.

The solar lamp system 100 is configured such that when the energy consumption routing circuit 122 routes electrical power from the battery 110 (or more broadly, the "electrical energy source") to the lamp 130, the system 100 adjusts the amount of power delivered along the energy consumption routing circuit 122 downward as a function of a remaining amount of available electrical energy in the battery. As mentioned above, since terminal voltage V is a function of the remaining electrical energy in the battery, this might be accomplished using the terminal voltage. In the more general case of an electrical energy source, this may be done based on any parameter which relates to available energy in the electrical energy source. Furthermore, as mentioned above, this reduction in power consumption may be greater in proportion than the reduction in light emissions due to improved efficacy at lower power consumption.

In some embodiments, the reduction in power consumption when the terminal voltage (or more generally the available energy or power in the electrical energy source) declines may be accomplished using a passive network. For instance, the passive network 131 may be included within the lamp, and may include LED diodes, and potentially also resistors. A specific design will be described with respect to FIG. 5. However, the principles of the present invention are not limited to such a design. For instance, a passive network may route current through voltage drops such that when the voltage at the input of the passive network is higher (reflective of a higher battery terminal voltage), more LED diodes in the passive network are actively emitting than that when the voltage at the input of the passive network is lower. Thus, as the terminal voltage reduces, so does the number and intensity of the LED diodes that are emitting in the passive network.

The principles described herein are not limited to the particular functional relationship between the power consumed by the lamp 130 and the terminal voltage of the battery 110. Nevertheless, it is most advantageous when the relationship is defined such that a reduction in the power consumption causes a proportionately lesser reduction in the light emissions.

Figure 2:
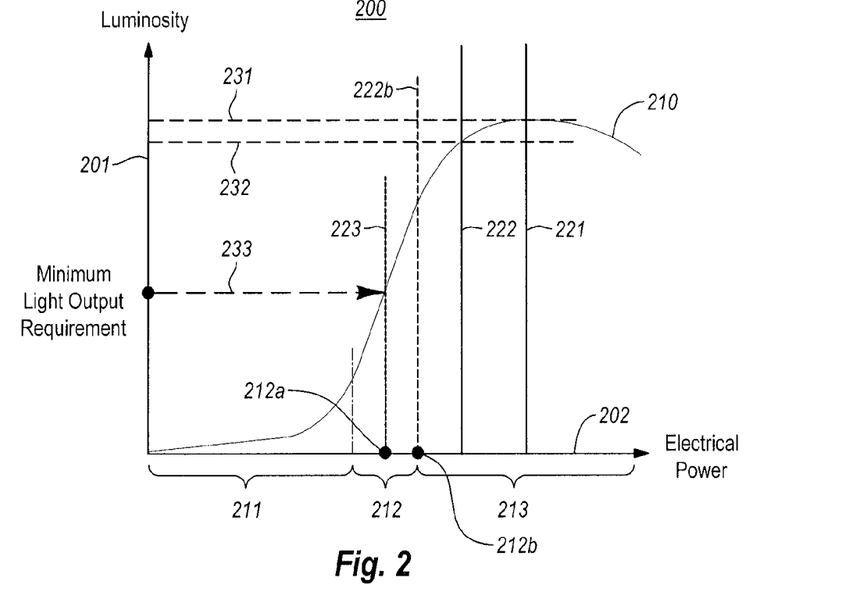
FIG. 2 illustrates an example Light Emitting Diode of how the energy delivered to the lamp by the controller may be reduced as a function of the remaining available electrical energy in the battery.

FIG. 2 illustrates an approximate graphical representation 200 of a relationship between power consumption and luminosity for a lamp built with a network of light emitting diodes and resistors. Luminosity is on the vertical axis 201, and electrical power is on the horizontal axis 202. The relationship is approximated with curve 210 only to show the abstract principles. The precise shape of the curve may differ according to the type of LEDs that the lamp is comprised of, and also the design of the lamp; especially its heat dissipation that determines the temperature at the light emitting junctions. The junction temperature can critically affects the amount of light output; thus the heat dissipation capability critically determines the function of luminosity as function of power input to the LED.

Nevertheless, each LED lamp has an inactive region 211 in which the electrical power is near or below the threshold of the LED diode thereby being too low to cause significant light emissions from the diode; even part of region 211 can provide very high efficacy but not a large amount of luminosity.

Each LED lamp also has a linear region 212 that is above the threshold of the LED diode, causing an approximate linear relationship between change in electrical power, and change in luminosity. This region maintains almost a constant efficacy with significant amount of luminosity.

Each LED lamp also has a saturation region 213 in which increases in electrical power cause a less proportionate increase in luminosity. Stated differently, in the saturation region 213, reductions in electrical power cause a less proportionate reduction in luminosity. It is in the saturation region that most LED lights operate. Accordingly, reductions in the electrical power provided to the lamp (from perhaps amount 221 to 222), cause a proportionately less reduction in luminosity (from amount 231 to 232) as illustrated. There is another important parameter indicated in FIG. 2. The minimum required amount of luminosity is indicated as line 233; and the corresponding power is indicated as line 223. This line 223 may fall inside the region defined as 212. Thus, the lamps shall be designed to operate in the region above 212a to provide more than the specified luminosity level. In fact, the corresponding voltage of the power region 213 (say, 12.3 to 13.5 volts) shall be coincided with most of the designed operational power region (above 212b region). For our design, the corresponding battery voltage range for the designed operational region is from 11.5 to 13.5 volts. In other words, the I-V characteristic of the designed lamps is shaped to match this requirement.

Figure 3:
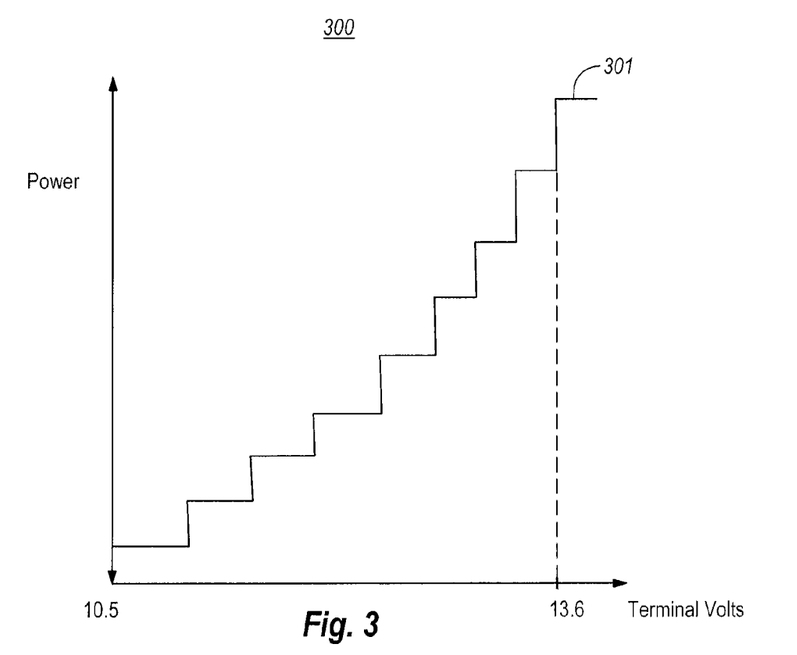
FIG. 3 illustrates a step function example of how the energy delivered to the lamp by the controller may be reduced as a function of the remaining available electrical energy in the battery.
Figure 4:
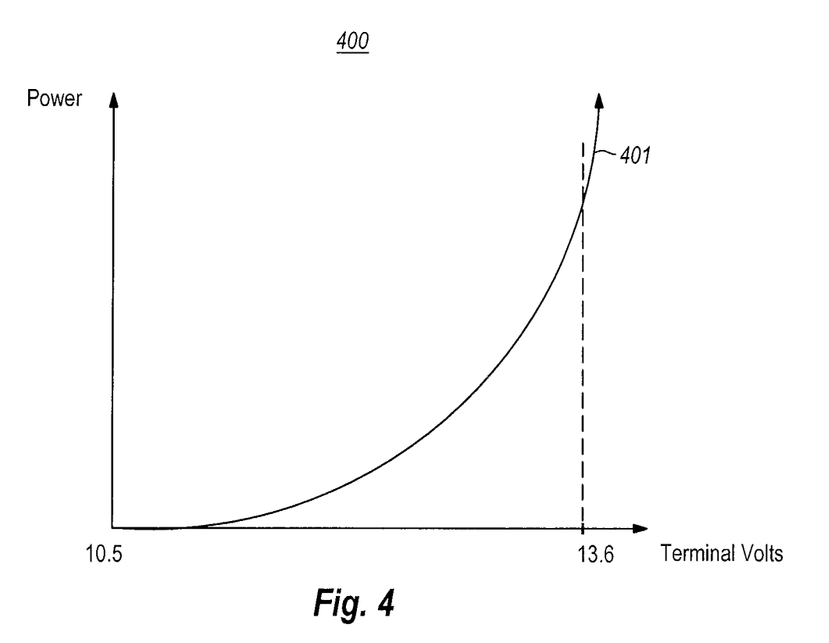
FIG. 4 illustrates a continuous function example of an example Light Emitting Diode (Lamp) response.

There is no limited to the functional relationship between power delivered to the lamp and terminal voltage. However, FIG. 3 illustrate a graphical relationship 300 in which the relation 301 is a step function. FIG. 4 illustrates a graphical relationship 400 in which the relation 401 is a continuous function. The actual function may be a combination of step function and continuous function.

Figure 5:
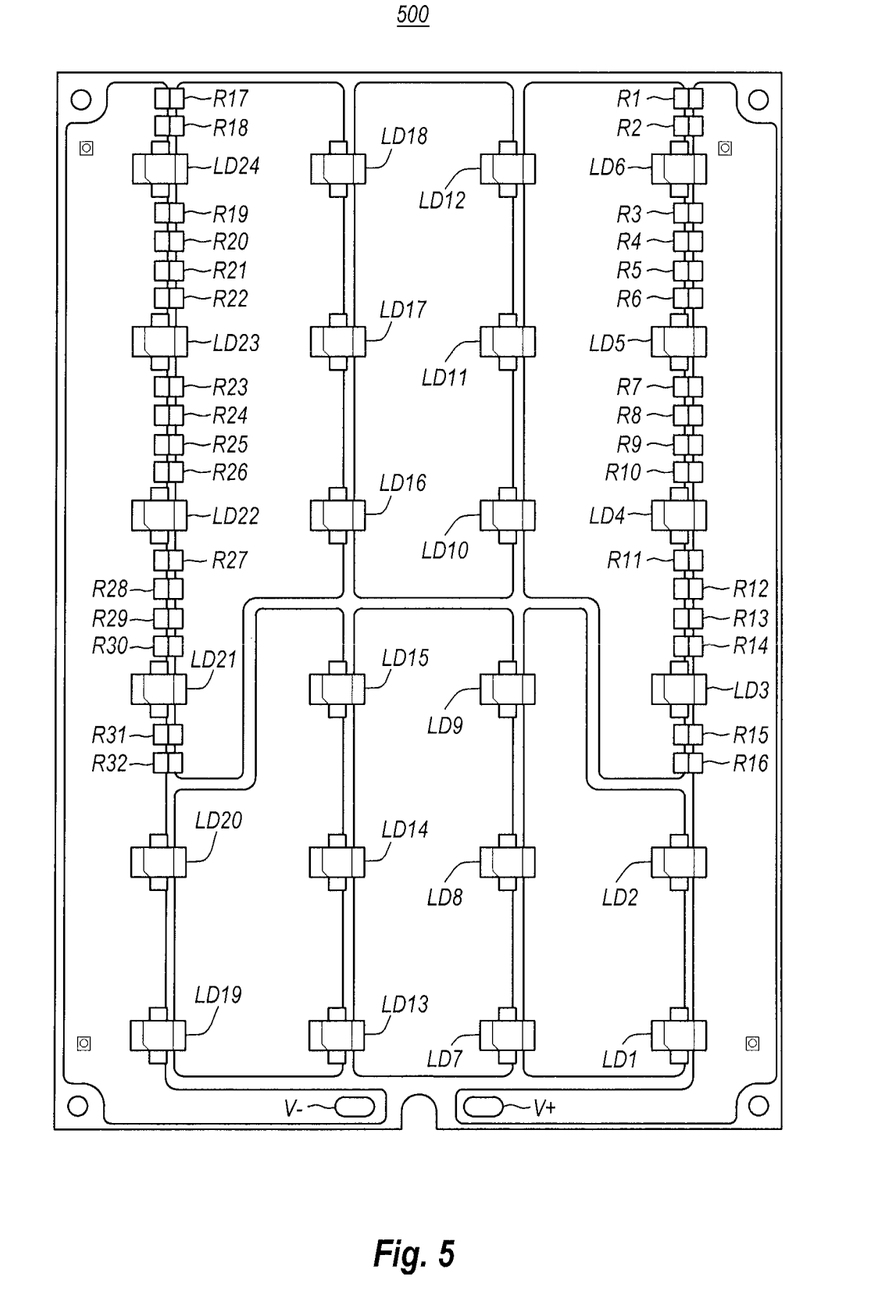
FIG. 5 illustrates an example passive network of resistors and diodes that may be used to deliver a reduced amount of electrical power to the lamp when the remaining available electrical energy in the battery is reduced.

FIG. 5 illustrates a passive network 500 that may be used as the passive network 131 of FIG. 1. The passive network 500 includes multiple passive components including a combination of LED diodes and resistors. As shown in FIG. 5, a lighting assembly consists of 24 LED (labelled LD1 through LD24) which are networked into two groups, each group coupled in parallel between the battery terminals V+ and V−.

One of the LED groups consists of a series connection of four LED subgroups. Each LED subgroup consists of different numbers of LEDs in parallel connections. For instance, one LED group consists of a series of four subgroups, wherein the first LED subgroup consists of four parallel LEDs LD3 through LD6, the second LED subgroup consists of three parallel LEDs LD10 through LD12, the third LED subgroup consists of three parallel LEDs LD16 through LD18, and the fourth LED subgroup consists of four parallel LEDs LD21 through LD24. The other of the LED groups also consists of a series connection of four subgroups of LEDs consisting of different numbers of LEDs in parallel. For instance, this other LED group consists of a series of four subgroups, wherein the first LED subgroup consists of two parallel LEDs LD1 through LD2, the second LED subgroup consists of three parallel LEDs LD7 through LD9, the third LED subgroup consists of three parallel LEDs LD13 through LD15, and the fourth LED subgroup consists of two parallel LEDs LD19 through LD20. Note that the first subgroup of LEDs LD3 through LD6 in the first LED group also has coupled in parallel 16 resistors R1 through R16, and that the fourth subgroup of LEDs LD 21 through LD24 also has coupled in parallel 16 resistors R17 through R32.

This network of LED can be viewed as a network of voltage determined variable resistances; and thus the network would carry different currents when the terminal voltage is different. The smaller the terminal voltage, the smaller the current in this network. Thus, the smaller the terminal voltage, the smaller the amount of power consumed by the network.

Table 1 list the measured power consumptions of this assembly (network) with terminal voltages ranging from 13.5 volts down to 10.5 volts as follows:

TABLE 1

| Voltage (V) | Current (A) | Power consumption (W) | lm | Lm/W |
|---|---|---|---|---|
| 13.5 | 2.98 | 40.2 | 2331.6 | 58.0 |
| 13.0 | 1.51 | 19.63 | 1315.4 | 67.0 |
| 12.8 | 1.39 | 17.79 | 1231.3 | 69.2 |
| 12.5 | 1.23 | 15.38 | 1116.2 | 72.6 |
| 12.3 | 1.10 | 13.53 | 1019.5 | 75.4 |
| 12.0 | 0.88 | 10.56 | 842.9 | 79.8 |
| 11.5 | 0.58 | 6.67 | 580.7 | 87.1 |
| 11.0 | 0.32 | 3.52 | 329.2 | 93.5 |
| 10.8 | 0.22 | 2.38 | 231.6 | 97.3 |
| 10.5 | 0.1 | 1.05 | 104.2 | 99.2 |

As shown, the power consumption decreased monotonically from 40.2 watts at 13.5 volts down to 6.67 watts at 11.5 volts (by a factor of about 6).

Of course, the light output of this assembly (LED network) also varies with the carrying current. The smaller the current carried, the smaller the light output that can be produced. In other words, the smaller the power consumed by this LED network, the smaller the light output that the LED net work would provide. If we imposed the commercially specified minimum light output requirement, Lm>1500 lm; and we intend to use 3 paralleling assemblies to provide the lighting. The light output requirement for each assembly needs to be above 500 lm.

As shown in the Table 1, the measured light output decreased from 2331.6 lumens with 40.2 watts power consumption (at 13.5 volts) monotonically down to 580.7 lumens with 6.67 watts power consumption (at 11.5 volts). It can be expected from this that the light output of this 3 assemblies combined lamp shall emit more than 6994.8 lm at 13.5 volts; and shall emit more than 1740 lm when the battery terminal voltage is above 11.5 volts (that meets the greater than 1500 lm lighting requirement).

Measurements performed to determine the energy storage using two purchased 110 Ahr batteries to give a combination of 220 Ahr energy storage capacities. It was determined that from V=10.5 to 11.5 volts to be about 50 Ahr; and also from 10.5 to 13.5 volts to be about 225 Ahr. Thus, the energy output from discharging a 220 Ahr battery from 13.5 volts down to 11.5 volts would be more than 170 Ahr in energy; more than (220-50)/220=77.27% of the battery energy capacities.

The discharged time was also measured. The performed measurement uses a lamp consists of 3 units of the above designed lighting elements. This lamp discharges a 220 Ahr battery from V=13.5 volts down to V=11.5 volts, and then down to 10.5 volts. The measured result shows that it takes more than 75 hours discharge time to accomplish from 13.5 to 11.5 volts experiment. Therefore, we expect the lamp can provide above required light output for more than 6 nights (with 12 hours' lighting per night). The remaining energy below 11.5 volts to 10.5 volts still can provide a reduced light output for more than additional 38 hours.

Thus, without energy input, the combined measured lighting time could exceed 9 nights (12 hours/night). The system can provide more than 6 nights lighting above the required level, and more than 3 additional nights in reduced lighting level at the end. Also, one normal sunny day (with 4 hours effective sun shine at the $10^{th}$ day) can make the system leap back in energy storage to provide at least 3 nights lighting.

When calculated, the efficacy of this assembly (LED network) is monotonically increased from 58 lumens per watt at 13.5 volts up to more than 87 lumens per watt at 11.5 volts. The calculated efficacy value increased to 99.2 lm per watt at 10.5 volts; as tabulated in the table.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A device comprising:
    an energy consumption routing circuit configured to selectively route electrical power from an electrical energy source to a lamp when the energy consumption routing circuit is coupled to the electrical energy source and to the lamp;
    wherein when the energy consumption routing circuit routes electrical power from the electrical energy source to the lamp, the device is configured to adjust the amount of power delivered along the energy consumption routing circuit downward as a function of available energy in the electrical energy source, such that reduction in the available energy in the electrical energy source cause a less proportionate reduction in luminosity of the lamp.

2. The device in accordance with claim 1, wherein the device is configured to adjust the amount of power delivered along the energy consumption routing circuit by using a passive network of a plurality of passive components in the lamp.

3. The device in accordance with claim 2, wherein the plurality of passive components includes a plurality of light emitting diodes.

4. The device in accordance with claim 2, wherein the plurality of passive components includes a plurality of resistors.

5. The device in accordance with claim 1, wherein the function includes a step function.

6. The device in accordance with claim 1, wherein the function includes a continuous function.

7. The device in accordance with claim 1, wherein electrical energy source is a battery.

8. The device in accordance with claim 7, wherein the function is a function of a terminal voltage of the battery.

9. The device in accordance with claim 7, further comprising:
    an energy collection routing circuit configured to route electrical power from an electrical energy source to the battery when the energy collection routing circuit is coupled to the electrical energy source and the battery.

10. The device in accordance with claim 9, further comprising:
    the electrical energy source coupled to the energy collection routing circuit is a solar panel.

11. The device in accordance with claim 1, further comprising:
    the lamp coupled to the energy consumption routing circuit.

12. The device in accordance with claim 1, wherein the lamp is a light emitting diode (LED) lamp.

13. The device in accordance with claim 1, wherein the lamp is an elevated street lamp.

14. A method for operating a lamp comprising:
    an act of channeling electricity from an electrical energy source to a lamp when the lamp is consuming electricity; and
    an act of adjusting downwards the amount of power channeled to the lamp as a function of available energy in the electrical energy source, such that reduction in the available energy in the electrical energy source cause a less proportionate reduction in luminosity of the lamp.

15. The method in accordance with claim 14, wherein the function is a function of terminal voltage of the battery.

16. The method in accordance with claim 14, wherein the lamp is a light emitting diode (LED) lamp.

17. The method in accordance with claim 14, wherein the lamp is an elevated street lamp.

18. The method in accordance with claim 14, wherein the electrical energy source is a battery.

19. The method in accordance with claim 18, further comprising:
    an act of channeling electricity from a solar panel to the battery when the solar panel is generating electricity.

20. A lamp system comprising:
    an electrical energy source terminal;
    a lamp; and
    a device configured to selectively route electrical power from the electrical energy source terminal to the lamp when the energy consumption routing circuit is coupled to the electrical energy source and to the lamp, the device further configured to adjust the amount of power delivered to the lamp downward as a function of available energy in the electrical energy source, such that reduction in the available energy in the electrical energy source causes a less proportionate reduction in luminosity of the lamp.

* * * * *